United States Patent
Shay et al.

(10) Patent No.: US 6,314,215 B1
(45) Date of Patent: Nov. 6, 2001

(54) FAST ALL-OPTICAL SWITCH

(75) Inventors: Thomas M. Shay, Las Cruces, NM (US); Evgeni Y. Poliakov, Rochester, NY (US); David A. Hazzard, Kirtland, NM (US)

(73) Assignee: New Mexico State University Technology Transfer Corporation, Las Cruces, NM (US)

( * ) Notice: Subject to any disclaimer, the term of this patent is extended or adjusted under 35 U.S.C. 154(b) by 0 days.

(21) Appl. No.: 09/358,686

(22) Filed: Jul. 21, 1999

Related U.S. Application Data
(60) Provisional application No. 60/100,733, filed on Sep. 17, 1998.

(51) Int. Cl.$^7$ .................................................. G02B 6/26
(52) U.S. Cl. ................................ 385/16; 385/11; 385/24
(58) Field of Search ................................. 385/11, 16, 24

(56) References Cited

U.S. PATENT DOCUMENTS

| | | |
|---|---|---|
| 3,667,066 | 5/1972 | Kastler et al. . |
| 3,720,882 | 3/1973 | Tang et al. . |
| 4,406,003 | 9/1983 | Eberly et al. . |
| 4,656,439 | 4/1987 | Wessel et al. . |
| 4,761,050 * | 8/1988 | Byron . |
| 4,918,699 | 4/1990 | Boyd . |
| 5,076,672 | 12/1991 | Tsuda et al. . |
| 5,268,785 | 12/1993 | Crenshaw . |
| 5,272,436 | 12/1993 | Chaillout et al. . |
| 5,710,845 | 1/1998 | Tajima . |
| 5,771,117 | 6/1998 | Harris . |

OTHER PUBLICATIONS

Jonusauskas, J., et al., "'Fast' Amplifying Optical Kerr Gate Using Stimulated Emission of Organic Non–Linear Dyes," *Opt. Comm.*, vol. 137, pp. 199–206 (1997).

Nakamura, S., et al., "Cross–Correlation Measurement of Ultrafast Switching in a Symmetric Mach–Zehnder All–Optical Switch," *Appl. Phys. Lett.*, vol. 67, pp. 2445–2447 (1995).

Nakamura, S., et al., "Ultrafast polarization–Discriminating Mach–Zehnderall–Optical Switch," *Appl. Phys. Lett,*, vol. 67, pp. 3709–3711 (1995).

Nesset, D., et al., "Signals at the Same Wavelength Using Four–Wave Mixing in a Semiconductor Laser Amplifier," *Electron. Lett.*, vol. 31, pp. 896–897 (1995).

Ranon, P.M., et al., "All–Optical Programmable and Gate Implementation in a Germanium–Doped Silica Planar Waveguide," *Appl. Physc. Lett.*, vol. 67, pp. 3532–3534 (1995).

(List continued on next page.)

*Primary Examiner*—Hung N. Ngo
(74) *Attorney, Agent, or Firm*—Andrea L. Mays; Deborah A. Peacock

(57) ABSTRACT

An apparatus and method wherein polarization rotation in alkali vapors or other mediums is used for all-optical switching and digital logic and where the rate of operation is proportional to the amplitude of the pump field. High rates of speed are accomplished by Rabi flopping of the atomic states using a continuously operating monochromatic atomic beam as the pump.

118 Claims, 6 Drawing Sheets

OTHER PUBLICATIONS

Knize, R.J., "Optical NOR Gate Using Cesium Vapor," *Opt. Lett.*, vol. 17, pp. 244–246 (1992).

Maker, P.D., et al., *Phys. Rev.*, vol. 137, pp. A801–A818 (1965).

Bonch–Breuvich, A.M., et al., "Resonant Birefringence in the Electric Field of a Light Wave," *Pis'ma ZETF*, vol. 3, No. 11 pp 425–429 [reproduced on pp. 279–281] (Jun. 1, 1996).

Bonch–Breuvich, A.M., et al., "Induced Circular Birefringence in Rubidium Vapor," *Soviet J. Opt. Spectrosc.*, vol. 34, pp. 195–197 (Jan. 1973).

Liao, P.F., et al., "Polarization Rotation Induced by Resonant Two–Photon Dispersion," *Physc. Rev. Lett.*, vol. 36, pp. 584–587 (Mar. 15, 1976).

Bakhramov, et al., "Self–Induced Optical Activity (SIOA) in a Resonant Medium," *Phys. Lett A*, vol. 141, No. 1.2, pp. 31–33 (Oct. 23, 1989).

Bakhramov, S.A., et al., "Self–Rotation of the Polarization Ellipse of Laesr Radiation in Rubidium Vapors in Nonresonant Interactions," *Opt. and Spectrosc.*, vol. 81, No. 3, pp. 459–462, 1996.

Davis, W.V., et al., "Polarization–Ellipse Rotation by Induced Gyrotropy in Atomic Vapors," *Opt. Lett.*, vol. 17, No. 18, pp. 1304–1306 (Sep. 15, 1992).

Wieman, C., et al., "Doppler–Free Laser Polarization Spectroscopy," *Phys. Rev. Lett.*, vol. 36, No. 20, pp. 1170–1173 (May 17, 1976).

Delone, N.B., et al., *Atoms in Strong Light Fields*, Springer–Verlag, Berlin, Heidelberg, pp. 83–85, (1985).

Demtroder, W., *Laser Spectroscopy*, Springer–Verlag, Berlin Heidelberg NY, pp. 505–521 (1982).

Bhaskar, N.D., et al., "Propagating, Optical–Pumping Wave Fronts," *Phys. Rev. Lett.*, vol. 43, No. 7, pp. 519–521 (Aug. 13, 1979).

Boyd, R.W., *Nonlinear Optics*, Academic Press, Inc., pp. 126–133 (1992).

Poliakov, E.Y., "Optical Switching in Atomic Vapors: Theoretical Model of an All–Optical and Gate," Thesis of May 1998.

* cited by examiner

FAST ALL-OPTICAL SWITCH

CROSS-REFERENCE TO RELATED APPLICATIONS

This application claims the benefit of the filing of U.S. Provisional Patent Application Ser. No. 60/100,733, entitled Fast All-Optical Switch, filed on Sep. 17, 1998, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract No. NAG-5-1491, awarded by NASA.

BACKGROUND OF THE INVENTION

1. Field of the Invention (Technical Field)

The present invention relates to linear optical devices used to effectuate switching.

2. Background Art

Since lasers have become routinely utilized, there has been considerable interest in the development of optical computing devices. In modem communication links, the requirement for both a high data rate and small error probability requires implementation of all-optical devices. It has become widely accepted that optical networks should fully replace the traditional electronics.

All-optical devices have the advantage of such important properties of light as high frequency, broad spectral range, high speed and capability of parallel processing. Various applications of optical computing and its essential components have been presented, including pattern recognition, polarization-encoding, optical interconnects, and logic gates which were initially based on spatial filtering. Among these, optical gates and/or optical switches are key devices for all-optical networks. For example, ultrafast switches are very attractive for time division, multiplexers and demultiplexers apart from being the basic logic elements of future computing devices.

The operating principles of all-optical elements can differ significantly from one realization to another. (the different techniques are compared by their performance in Table 1.) However, several common features unify them. A signal beam of a definite polarization or a known frequency is used. Upon propagation through some optically active medium or a waveguide with variable characteristics, the initial polarization and/or the frequency of the signal beam changes. Generally, the logic element is built on the state of the polarization or the frequency change for the signal beam, while the initial signal state serves as a reference point. Some methods exploit optical anisotropy of organic molecules, while others utilize the nonlinear properties of a medium. An alternative approach is the implementation of polarization rotation.

The variations of medium characteristics can be caused by absorption/gain saturation and/or a non-linear phase shift, or by some other mechanism. These variations are typically associated with a refractive index change induced by the applied electromagnetic field(s) and/or their interactions with the medium. To control the logic element performance, a command link, such as an external source linked to variation of medium characteristics to change of the signal state, is usually formed.

A modified Mach-Zehnder all-optical switch (see Table 1) utilizes a semiconductor band-filling effect. A phase difference between two components of the signal beam is obtained in a non-linear waveguide, and the subsequent polarization discrimination is implemented. Although rise and fall times of 1.3 ps can be obtained (by ultrafast pulse excitation) and are not limited by the slow relaxation time of induced optical non-linearities, there exist several impeding factors. In spite of reaching switching speed (on-off time) of 40 ps, the repetition rate is only approximately 12 ns, which is approximately three orders of magnitude larger. The non-linear refractive index change, induced in the waveguide, is not constant with time. Therefore, it is not clear how stable this switch is over time intervals exceeding several cycles. The low light coupling efficiency, typical for many non-linear processes, is estimated to be approximately 10% and brings up the question of the stability of the optical non-linearities.

The amplifying optical Kerr gate overcomes the problem of low efficiency as the maximum transition intensity gain reaches 40 at a wavelength of 650 nm. This is due to amplification in a non-linear Kerr medium composed of organic molecules and laser dyes with intrinsic anisotropy. Nevertheless, the pulse width of such a gate is only about 20 ps and is limited by the reorientation time of the dye molecules. Reorientation time represents the repetition rate, during which the signal amplification can be obtained, and during which the Kerr gate operates successfully. In order to increase the time interval, the polarization must be adjusted as well as the amplitude of a closing pulse, but such a procedure is very delicate and critical. The alternative method of finding non-linear materials with much longer relaxation times is still the subject of future research.

Other methods, shown in Table 1, exploit a signal beam scattering from dynamic gratings induced in a non-linear medium due to the presence of second or third-order susceptibility. An AND gate based on four-wave mixing in a semiconductor laser amplifier can provide two 10 GBit/s data streams with an error bit rate less than $10^{-10}$. However, gate operation is limited by the nanosecond time interval, during which the induced grating exists. Another all-optical AND gate results in a signal-to-noise ratio of 17 dB. Due to high waveguide losses and the lack of diffraction in the planar direction, the second-harmonic generated signal is only about 150 nW, which shows the low efficiency of the process. Another disadvantage of both gates is their slow repetition rates.

A more promising alternative is the implementation of polarization rotation. Polarization saturation spectroscopy examines the interaction of counter-propagating beams in a moderately dense atomic/molecular vapor. Due to the atomic/molecular interactions with laser beams and subsequent changes in the polarization, a significant amount of optical birefringence is introduced so that there can be large differences in transmission. Beam transmission controlled by another laser can be applied for some form of an all-optical device.

Different aspects of polarization rotation phenomena have been studied, especially the effects in alkali vapors. A resonant birefringence due to the optically induced level shifts and optical dichroism under the direct resonance absorption have been suggested. The polarization rotation induced by resonant two-photon dispersion in sodium vapor has also been studied. Self-induced optical activity under resonant and non-resonant conditions in rubidium vapors have been observed experimentally. An optical NOR gate using another alkali vapor, cesium, has also been demonstrated.

Although published less than one year before the priority date of this application, the New Mexico State University thesis entitled Optical Switching in Atomic Vapors: Theoretical Model of an All-Optical AND Gate, by Evgeni Yurij Poliakov, provides useful background information and is herein incorporated by reference.

The following patents disclose all optical devices and related subject matter but are quite different from the present invention: U.S. Pat. No. 5,771,117, to Harris et al., entitled Method and Apparatus for Nonlinear Frequency Generation Using a Strongly-Driven Local Oscillator; U.S. Pat. No. 5,710,845, to Tajima, entitled AH-Optical Switch; U.S. Pat. No. 5,272,436, to Chaillout et al., entitled Optical Pumping, Resonance Magnetometer Using a Light Beam with Controlled Polarization; U.S. Pat. No. 5,268,785, to Crenshaw et al., entitled All-Optical Switch Utilizing Inversion of Two-Level Systems; U.S. Pat. No. 5,076,672, to Tsuda et al., entitled All-Optical Switch Apparatus Using a Nonlinear Etalon; U.S. Pat. No. 4,918,699, to Boyd et al., entitled System for Combining Laser Beam by Transfer of Energy Therebetween in Atomic Vapor, U.S. Pat. No. 4,656,439, to Wessel, entitled System for Nanosecond Modulation of an Infrared Laser Beam by Coherent Stark Switching; U.S. Pat. No. 4,406,003, to Eberly et al., entitled Optical Transmission System; U.S. Pat. No. 3,720,882, to Tang et al., entitled Parametric Frequency Conversion; and U.S. Pat. No. 3,667,066, to Kastler et al., entitled Optically Pumped Alkali Atomic Beam Frequency Standard.

Optical devices based on nonlinear optical processes are typically characterized by low efficiency. Another disadvantage of such devices is low repetition rates. The present invention is an all optical multiplexer based on linear polarization rotation in alkali vapors and does not induce optical nonlinearities.

This approach is based on linear interactions of the laser radiation with an active medium of alkali atoms. Fast and efficient optical switching can be reached in a linear regime. Fast rise times and fast fall times are both necessary. To increase speed, stimulated induced emission of the excited atoms to the ground state effectively reduces the relaxation time of the atoms. Fast oscillations, obtained through the interactions of a pump beam with the alkali atoms controls the polarization rotation and the transmission of a linearly polarized signal beam. Specifically, a circularly polarized pump is tuned to exact resonance of the $S_{1/2} \rightarrow P_{1/2}(J_{1/2} \rightarrow J_{1/2})$ transition of alkali vapors. Multiplexers and other forms of digital logic are accomplished with this methodology. Excited atoms are driven with rates that are much faster than the spontaneous relaxation rate.

TABLE 1

Performances of various all-optical elements.

| | Different Types of Gates/Switches | | | | |
|---|---|---|---|---|---|
| Performance Characteristics | "Fast" Kerr Gate | Ultrafast Mach-Zehnder Switch | AND Gate on Four-Wave Mixing | Programmable AND Gate | Proposed Gate Model |
| Data Rate per Channel | 50 Gbit/s | 0.1 Gbit/s | N/A | 10 Gbit/s | 30–50 Gbit/s |
| Signal Gain | 2.4–40 | <0.1 | $10^{-3}$ | $10^{-5}$ | 0.25–4.0 |
| Response Times: | | | | | |
| a) rise time | 2.5 ps | 1.3 ps | est. 50 ps | N/A | ~10–15 ps |
| b) fall time | 5–15 ps | 1.3 ps | est. 50 ps | N/A | ~10–15 ps |
| Repetition Rate | 20 ps | 12 ns | est. 100 ps | 1 ms* | ~20–35 ns |
| Saturation Time | N/A | N/A | nanoseconds** | nanoseconds** | ~200 ns |
| Pump Requirements: | | | | | |
| a) laser operation | pulse | pulse | continuous | pulse | continuous |
| b) pulse duration | ~1 ps | 40 ps | N/A | 100 ps | N/A |
| c) power | ~20 MW | ~125 mW | 10 mW | 0.24–0.3 W | est. 1.0 W |
| Extinction Ratio | N/A | N/A | >100 | N/A | 200 |
| Operating Wavelength | 650 nm | 880 nm | 1548.8 nm | 532 nm | 400–780 nm |

*- due to Q-switching technique
**- time is limited by the existence of the dynamic gratings.

SUMMARY OF THE INVENTION
(DISCLOSURE OF THE INVENTION)

In summary, the present invention is an all-optical switch made up of an incident optical signal, an optically active polarization rotation medium, an optical pump to produce stimulated emission within the polarization rotation medium and a polarizing beam splitter. The optical pump further induces Rabi flopping of the atomic states. Preferably the optical pump is made of a continuous wave optical pump, rather than a pulse, to continuously stimulate the polarization rotation medium. Preferably the optical pump is circularly polarized to create time dependent circular birefringence within the polarization rotation medium. A wavelength selective coupler, for example a dichroic mirror, is located between the output of the polarization rotation medium and the polarizing beam splitter. The polarization rotation medium can be made up of an optically active vapor, for example, an alkali vapor. The incident optical signal is preferably linearly polarized, having a right-hand circularly polarized component and a left-hand circularly polarized component. The path length of the polarization rotation medium is of a length so that the right-hand circularly polarized component and left-hand circularly polarized component of the incident optical signal experience different indices of refraction within the polarization rotation medium. These different indices of refraction cause the two circularly polarized components to be separated by approximately 180 degrees. The fast all-optical switch can be used to perform multiplexing, demultiplexing, all-optical modulation, frequency shift-keying, and digital logic.

In a second embodiment, the optically active polarization rotation medium is solid state. In this embodiment, a wavelength selective coupler is located between the solid state medium and the polarizing beam splitter, as in the first embodiment. The optical pump is a continuous wave optical pump to continuously stimulate the solid state medium and can induce Rabi flopping of the atomic states. The optical pump also is circularly polarized to create time dependent circular birefringence within the solid state medium. The incident optical signal is linearly polarized, having both right-hand and left-hand circularly polarized components. These components experience different indices of refraction within the solid state medium and become separated by preferably approximately 180 degrees. In the solid state embodiment, the optical pump can be linearly polarized to produce linear birefringence within the solid state medium, instead of being circularly polarized. The incident optical signal is linearly polarized, and is preferably polarized at approximately 45 degrees relative to the linearly polarized optical pump. The path length of the solid state embodiment provides approximately 90 degrees of polarization rotation to the incident optical signal. This embodiment also has application in multiplexing, demultiplexing, all-optical modulation, frequency shifting, and digital logic.

A method is also provided for all-optical switching, and the method comprises the steps of providing an optical signal and passing that optical signal through an optically active polarization rotation medium. Stimulated emission and Rabi flopping of the atomic states is provided by pumping with an optical pump the polarization rotation medium, and the components of the optical signal are split with a polarizing beam splitter after having passed through the polarization rotation medium. Continuous pumping provides stimulated emission of the polarization rotation medium. Time dependent circular birefringence is created within the polarization rotation medium with a circularly polarized optical pump. Coupling the optical signal coming out of the polarization rotation medium with the polarizing beam splitter is accomplished with a wavelength selective coupler. Preferably the optical signal is passed through an optically active vapor, for example, an alkali vapor. Preferably a linearly polarized optical signal is provided, having both left- and right-hand circularly polarized components for passage through the polarization rotation medium. Upon passing the optical signal through the polarization rotation medium, the path length of the rotation medium is such that the two components of the optical signal experience different indices of refraction and are preferably separated by approximately 180 degrees.

The step of passing the optical signal through an optically active polarization rotation medium can comprise passing it through a solid state medium. Again, a wavelength selective coupler couples the optical signal coming out of the solid state medium with the polarizing beam splitter. While this is occurring, the optical pump is continuously pumping the solid state medium to produce stimulated emission and can induce Rabi flopping of the atomic states. Either time-dependent circular birefringence or linear birefringence is created within the solid state medium using the optical pump. If circular birefringence is created, then the optical signal needs to be linearly polarized so that its two components will experience different indices of refraction within the solid state medium. If the optical pump is linearly polarized, then the optical signal must also be linearly polarized and preferably is polarized at approximately 45 degrees relative to the linearly polarized optical pump. Furthermore, the path length of the solid state medium must provide approximately 90 degrees of polarization rotation to the optical signal if linearly polarized pumping is used. Either of these methods can include any of the steps of demultiplexing the optical signal, modulating the optical signal, frequency shift-keying the optical signal, and digital logic gating the optical signal.

A primary object of the present invention is to achieve an all-optical switch which can switch signals at rates significantly higher than electronic switching rates.

Another object of the present invention is to use an optical pump to drive atoms at rates much faster than spontaneous relaxation rate.

Yet another object of the present invention is to base the switch on linear interactions of the laser radiation with an active medium of alkali atoms.

A primary advantage of the present invention is that high multiplexing rates (Gbitsec) are achieved by Rabi flopping of the atomic states.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

Figure 4:
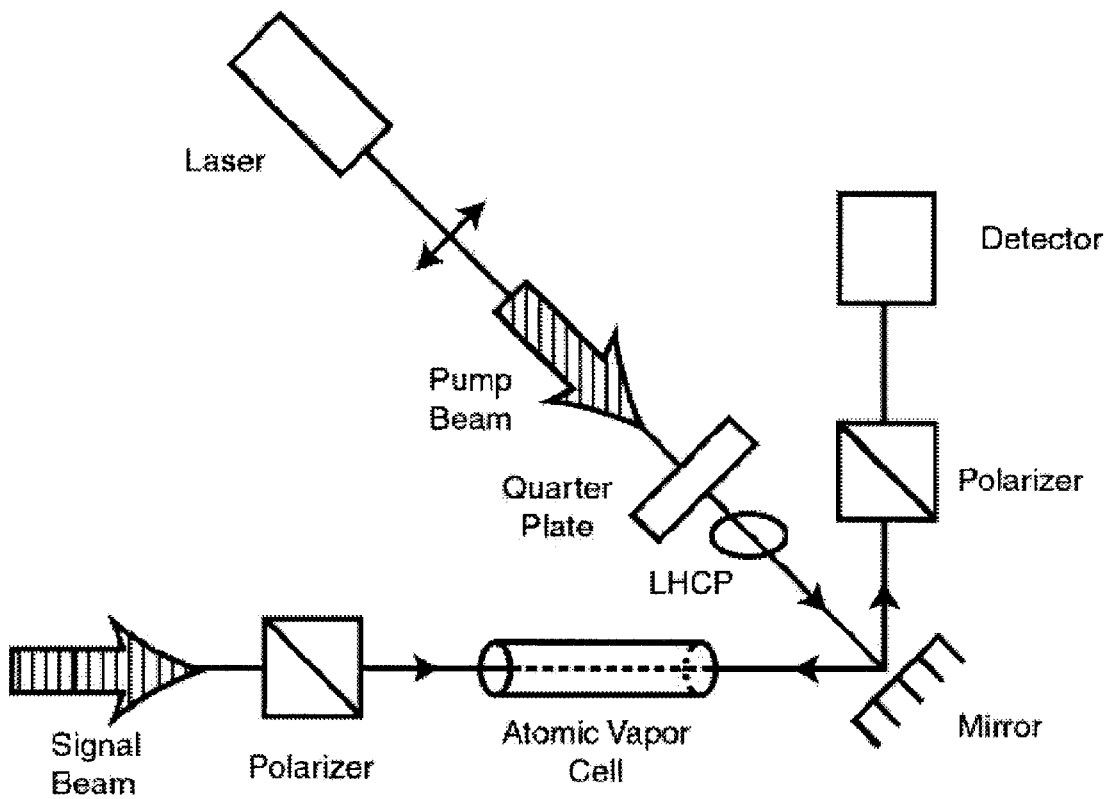
FIG. 4 is a block diagram of a typical experimental set-up for a polarization rotation mechanism.

Polarization spectroscopy deals with signals whose polarization can change with time. The change of the polarization state for a signal beam, propagating through a cell containing an optically active vapor, is caused by interactions of this vapor with a pump beam, which is also applied to the system. The pump beam induces the optical transitions in the gas medium and changes its refractive index and the absorption coefficient. As a result, the polarization rotation of the signal beam becomes possible. The scheme of a common experimental set-up is illustrated in FIG. 4.

In FIG. 4a, a probe beam, which is the incident optical signal, propagates in the opposite direction with respect to the direction of the pump. This signal can be, for example, a laser. The probe beam passes through a linear polarizer, enters the cell and goes through a second polarizer, which is crossed with the first one. Without the applied field, the gas density remains unchanged and isotropic, if the intensity of the signal wave is weak enough. The detector, placed behind the second polarizer, registers a low portion of the signal beam intensity caused by the residual transmission of the crossed polarizer.

However, if the sufficiently strong pump beam induces atomic transitions in the cell, the isotropic media becomes anisotropic Any atomic system is very sensitive to the polarization of the applied field. Only specific transitions induced by the electromagnetic field are allowed, and they depend on a particular orientation of the field in space, the field polarization. The atomic populations of the levels involved in the allowed induced transitions are driven by the applied field, while all the others remain unaffected. The presence of the pump field of a definite polarization produces a non-uniform population distribution of atomic sub-levels and unequal saturation regimes.

In these conditions, an incident linearly polarized field propagates through a vapor with an anisotropic refractive index Indeed, the refractive index is proportional to the atomic density. As mentioned before, if some of the (degenerate) levels of the ground state are affected by the field, whereas the others are not, the previously isotropic distribution among them becomes non-uniform.

For sake of simplicity, the linear polarization are decomposed into two independent left-hand circular polarization (LHCP) and right-hand circular polarization (RHCP) components. Without a pumping field, there is no change in the atomic densities, and there is no difference between the refractive indices of the LHCP and RHCP components of the signal wave, $n_{LHCP}$ and $n_{RHCP}$, respectively. Both wave components arrive at the end of the cell at the same time with velocity $c/n_{LHCP=c/nRHCP}$. However, if there is an applied field of, say, RHCP, $n_{RHCP}$ becomes smaller. The population difference between certain degenerate sub-levels of the ground state and some excited states is reduced as the excited states, previously empty, become intensively populated through the transitions induced by the RHCP field. At the same time the refractive index $n_{LHCP}$ does not change because the atomic populations, which define its value, remain the same since there are no induced transitions for them. As a result, the RHCP component of the signal wave propagates faster so that a non-zero phase delay angle occurs between the both components, and a plane of the polarization rotates.

By selecting a sufficiently long cell, the phase difference dose to $\pi$ can be accumulated. The linear polarization of the signal beam at the end of the cell becomes perpendicular with respect to the incident polarization. The final polarizer is transparent in this direction, so that the detector registers a maximum transmitted signal.

This analysis can be equivalently done for the pump field with LHCP. Effectively, different atomic transitions induced by the RHCP and LHCP components of the field are necessary. The effect of obtaining optical birefringence for the incident, linearly polarized probe beam is quite analogous to the Faraday effect. In the Faraday effect, non-isotropic orientation of the atoms is caused by the magnetic field. For polarization spectroscopy the optical field polarizes the atoms or molecules. Contrary to the Faraday effect where all molecules are oriented, here only those molecules which interact with the monochromatic pump become oriented through their induced dipole moments.

Figure 1:
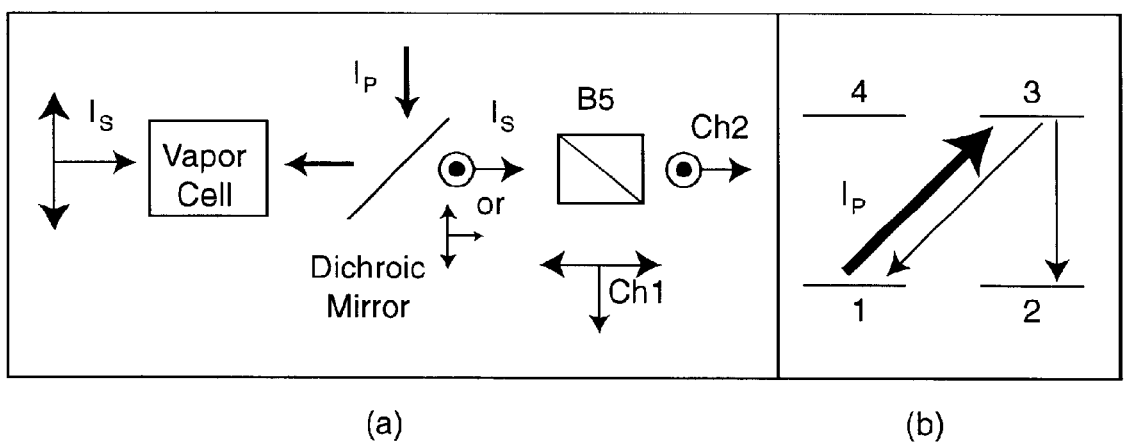
FIG. 1a is a block diagram of an experimental configuration for an all-optical multiplexer based on polarization rotation.
FIG. 1b is a simple four-level model of an alkali atom that neglects nuclear spin.

Attention is now turned to FIG. 1a. In FIG. 1a, similar to the common configuration used in polarization saturation spectroscopy, a linearly polarized signal beam of a low intensity $I_s$ propagates in an alkali vapor and then goes through a polarizing beam splitter, BS. An optical pump signal is represented by $I_p$. If the medium is isotropic, the signal light propagates through the beam splitter to channel 1. However, if a sufficiently strong pump beam, $I_p$, of a definite polarization is applied, the atomic density distribution changes. As shown in FIG. 1b, a left-hand circularly polarized (LHCP) pump reduces the population difference between ground level 1 and excited level 3. The selection rules forbid pumping level 4. Since the refractive index is proportional to the population difference, the two independent circular components, RHCP and LHCP, of the linearly polarized signal, $I_s$, experience different refractive indices. In FIG. 1a, the LHCP signal component propagates faster than the RHCP one. For an appropriate vapor length, a phase difference dose to $\pi$ can be accumulated, so that the plane of signal polarization is rotated by 90 degrees. Under these conditions, the polarizing beam splitter BS switches the signal to channel 2. Thus, the signal is switched to channel 2, if and only if the both beams are present when the pump field is turned on abruptly.

Rabi flopping of the atomic states controls polarization rotation and, therefore, the multiplexer output channel. To obtain Rabi flopping, a continuously operating pump that is switched on abruptly is required. Specifically, a LHCP atomic beam of intensity $I_p$ is turned to the resonance frequency $\omega_0$ of $S_{1/2} \rightarrow P_{1/2}$ transition in the alkali vapor. Four levels with neglection of nuclear spin are modeled in this configuration. To obtain GBit/s rates, induced emission of the excited atoms of level 3 is stimulated and they are driven back to zero with much faster rates than the spontaneous relaxation rate of $P_{1/2}$ state, $\Gamma$. On such short time scales, the widely employed steady state solutions are invalid. Therefore, a new solution for the exact time dependences of the atomic populations is required.

For the purposes of the model, it is assumed that the pump beam is monochromatic and the atoms are in an atomic beam. The latter assumption allows neglect of the atomic collisions and Doppler broadening. In addition, the pump is LHCP so it is not necessary to consider level 4. (The signal beam does not induce significant amount of optical transitions in the vapor because $I_s << I_p$.) Effectively, the four-level system in FIG. 1b reduces to the three levels, for which a closed form solution exists. The atomic probabilities, $\rho_{ii}$, are described by the system of density matrix equations:

$$\text{Im}(\dot\rho_{13}) = -\Gamma \text{Im}(\rho_{13}) + \gamma_{ind}(\rho_{11} - \rho_{33}),$$

$$\dot\rho_{11} = 2\Gamma\rho_{33}/3 - 2\gamma_{ind}\text{Im}(\rho_{13}),$$

$$\dot\rho_{22} = \Gamma\rho_{33}/3,$$

$$\dot\rho_{33} = -\Gamma\rho_{33} + 2\gamma_{ind}\text{Im}(\rho_{13}).$$

where the induced (by the pump field) multiplexing rate is given by $$\gamma_{ind} = (\sqrt{2}e/3\hbar)E_p<\Psi_3|r|\Psi_1> = E_p\sqrt{\Gamma c^3/(2\hbar\omega_0^3)},$$

and $\Psi_i$ is the wave function of i-th level; $E_p$ is the pump amplitude.

The induced rate $\gamma_{ind}$ is the Rabi flopping rate of the atoms between levels 1 and 3. If $\gamma_{ind} \gg \Gamma$, the atomic probabilities $\rho_{11}-\rho_{33}$ or $\rho_{11}-\rho_{33}$ oscillate sinusoidally with a period $\tau_{ind}$ (the results are not shown). The amount of polarization rotation is proportional to the difference $\rho_{11}-\rho_{33}$. As a result, if a signal beam is also present, the output channel oscillates periodically and the signal is switched between channels 1 and 2. Note that the multiplexing (Rabi) rate is directly proportional to the pump field amplitude $E_p$.

To decrease the signal beam attenuation in a vapor, the signal is shifted off-resonance by $\delta=\omega_0-\omega$. A linearly polarized signal can be decomposed into the two independent LHCP and RHCP components: $E_s=E_s(e_++e_-)\sqrt{2}$, where $$e_\pm = (\hat{x} \pm i\hat{y})/\sqrt{2}$$

are the corresponding unit vectors. In an absorptive medium with a complex refraction index, $n=n'+in''$, and induced atomic transitions $1\leftarrow\rightarrow 3$. the refractive coefficients $\beta\pm=wn'\pm/c$ and the absorption coefficients $a\pm=wn''/c$, are different for the LHCP and RHCP waves. After propagating through the vapor cell, the resultant attenuation for the signal beam is given as $$E_{s,out}=E_s(e^{(i\beta_+-\alpha_+)L}e_++e^{(i\beta_--\alpha_-)L}e_-)/\sqrt{2}$$

The intensity ratio of the signal with polarization rotated by 90 degrees to the initial signal defines the transmission coefficient.

$$T \equiv |E_{s,out} \cdot \hat{e}_\perp|^2/|E_s|^2,$$

where $\hat{e}_\perp$ is a unit vector perpendicular to $E_s$:

$$T=(e^{-2\alpha_+L}+e^{-2\alpha_-L}-2e^{-(\alpha_++\alpha_-)L}\cos\phi)/4$$

and the polarization rotation angle is $$\phi \equiv (\beta_--\beta_+)L=\omega(n'_--n'_+)L/c.$$

The multiplexer performance can be analyzed exactly based on the above equations and the calculations of the refraction index n and linear atomic susceptibility.

Figure 5:
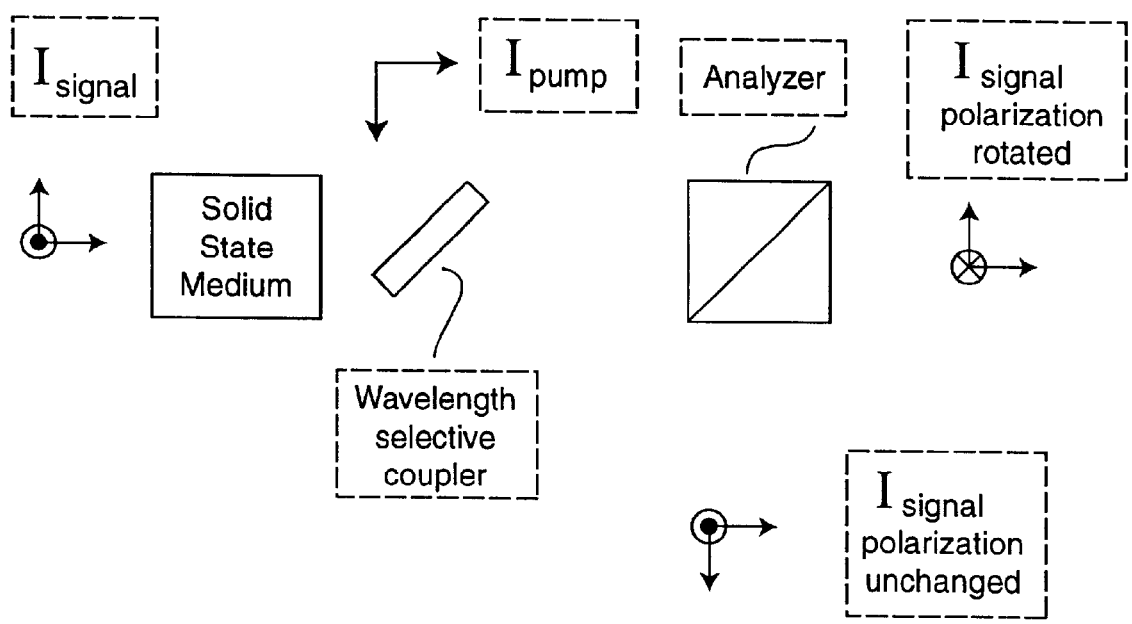
FIG. 5 is a block diagram of the linearly polarized optical pump embodiment of the present invention.

The second embodiment of the present invention can also be implemented in the solid state as shown in FIG. 5. Rabi flopping still allows the switch to operate at a speed that is many orders of magnitude higher than the natural decay time and by tuning the pump and signal frequencies to absorption resonances the required pump power is minimized. In the solid state, unlike in the gas phase, the pump beam may be linearly or circularly polarized depending upon the characteristics of the medium. If the strongest transitions in the medium are optimally excited by circular polarized photons, then the pump beam should be circularly polarized to optimize the excitation. Likewise, if the strongest transitions are excited by linearly polarized photons, then the pump beam should be linearly polarized In a direction to optimize the excitation. When a circularly polarized pump is used, the configuration is identical to the gaseous phase case discussed above. However, if a linearly polarized pump is utilized, then the signal beam should preferably be polarized at 45 degrees relative to the polarization of the pump beam however, other relative angles are achievable with different amounts of pumping and/or different path lengths. If that is done, then the linearly polarized pumped solid state medium will be a linearly birefringent material that can provide a 90-degree polarization rotation for the signal beam if the pump intensity and material length are properly adjusted.

INDUSTRIAL APPLICABILITY

The invention is further illustrated by the following non-limiting example.

EXAMPLE 1

To avoid unessential complexity, approximations that are justified by typical experiments were applied. The region of $\gamma_{ind} \gg \Gamma$ was considered to be of fastest bit rates. Furthermore, $\gamma_{ind}=500\ \Gamma$ was used, but conclusions are independent of this ratio. The signal and pump beam frequency are dose to each other: $\omega,\omega_0 \gg \delta$, but far exceed the feasible induced rates so that $\omega,\omega_0 \gg \gamma_{ind}$.

Figure 2A:
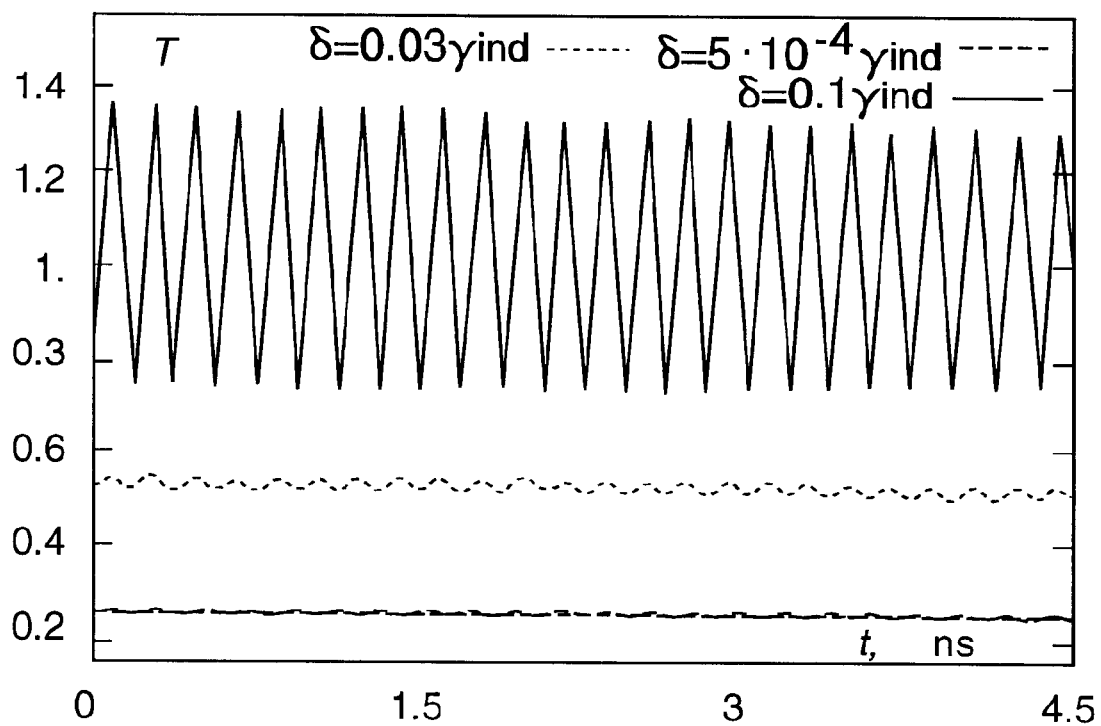
FIG. 2a is a plot of the transmission coefficient near atomic resonance, $\delta<\gamma_{ind}$, for different amounts of signal detuning $\delta$.

A plot of the transmission for signal frequencies near atomic resonance is presented in FIG. 2a. The signal beam transmission, based on the amount of polarization rotation, changed from channel 1 to channel 2 with the period while the pump was on. When $T=T_{max}$, LHCP pump produced population inversion in the medium so that $\rho_{11}-\rho_{33}\sim-\frac{1}{2}$, but $\rho_{22}-\rho_{44}\sim\frac{1}{2}$. At this time, the difference in the refractive indices for both circular components of the signal beam was maximum as $n_+$ was proportional $\rho_{22}-\rho_{44}$ and $n_-$ was proportional to $\rho_{11}-\rho_{33}$. By selecting the appropriate cell length L and vapor density N, the angle $\phi$ can be set to $\pm\pi$. There is a certain gain in channel 2 associated with the population inversion $\rho_{11}-\rho_{33}\sim-\frac{1}{2}$ while the transmission in channel 1 is always less than unity due to absorption. (Note that the sum of the transmissions of channels 1 and 2 divided by 2 equals unity.) Also note that the net signal attenuation decreases with $\delta$. When level 3 is unpopulated, the atomic density distribution becomes isotropic so that $n_-\approx N_+$ and $\phi\approx 0$. The signal polarization remains unchanged, and the multiplexer output is channel 1.

The transmission was maximized when $\phi=\pm\pi$. Using this as a design requirement and noting that $\phi$ was proportional to LN, the required atomic density N was determined. Although N depends strongly on $\delta$, it is between $10^{11}$ and $10^{14}$ cc for $L\sim 1$ cm. The product LN and $\delta$ became the multiplexer design parameters, and are independent of a particular vapor.

Figure 2B:
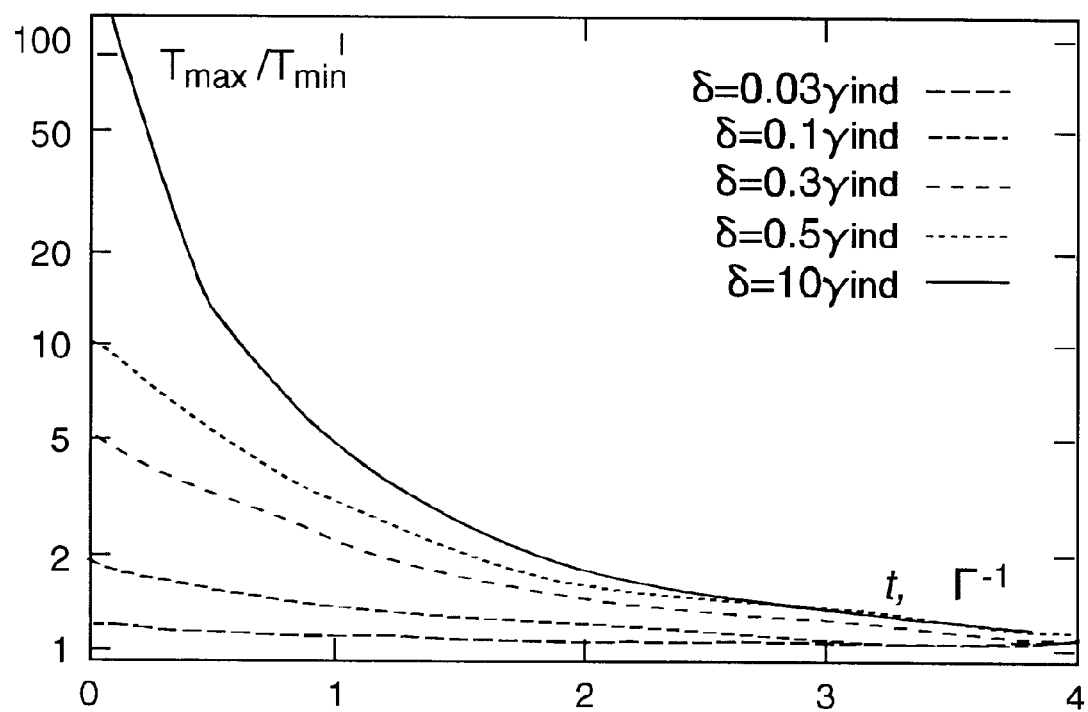
FIG. 2b is a plot of multiplexer transmission stability for different amounts of signal detuning $\delta$.

As was shown in FIG. 2a, $\tau_{ind}$ is independent of $\delta$. While the pump beam cannot stimulate transitions between levels 2 and 4, spontaneous emission from level 3 to 2 does occur, which results in an eventual optical pumping of population from level 1 to 2. As a result of partial depletion of level 1, the polarization rotation was decreased. This led to a time dependent decay Vs in the switching efficiency, dependent upon spontaneous relaxation time for level 3. To obtain optimum performance, the extinction ratio, $T_{max}/T_{min}$ was examined. In FIG. 2b it is shown that the extinction ratio always increases with $\delta$ while $\delta>\Gamma/2$. In fact, the atomic density is an increasing function in the same region. Clearly, if there are more atoms in the beam path, the polarization rotation is more efficient, and the ratio $T_{max}/T_{min}$ grows. However, the multiplexer transmission stability exhibits the opposite behavior, decreasing with $\delta$ and being the shortest in the off-resonance region, $\delta>\gamma_{ind}$. As a result, a trade-off is made between the desired level of the extinction ratio and its stability. In FIGS. 2a and 2b it is shown that the period of optical switching $\tau_{ind}$ is independent of $\tau_s$. Numerically, if $\gamma_{ind}>10\Gamma$, $\tau_{ind}=\pi/\gamma_{ind}$ and $\tau_s=6/\Gamma$. Since $\Gamma^{-1}\sim 30$ ns for the alkali vapors, the multiplexer functions for ~200 ns (see FIG. 2b). The corresponding bit rate is $R_b=\tau_{ind}^{-1}=\gamma_{ind}/\pi$.

Figure 3:
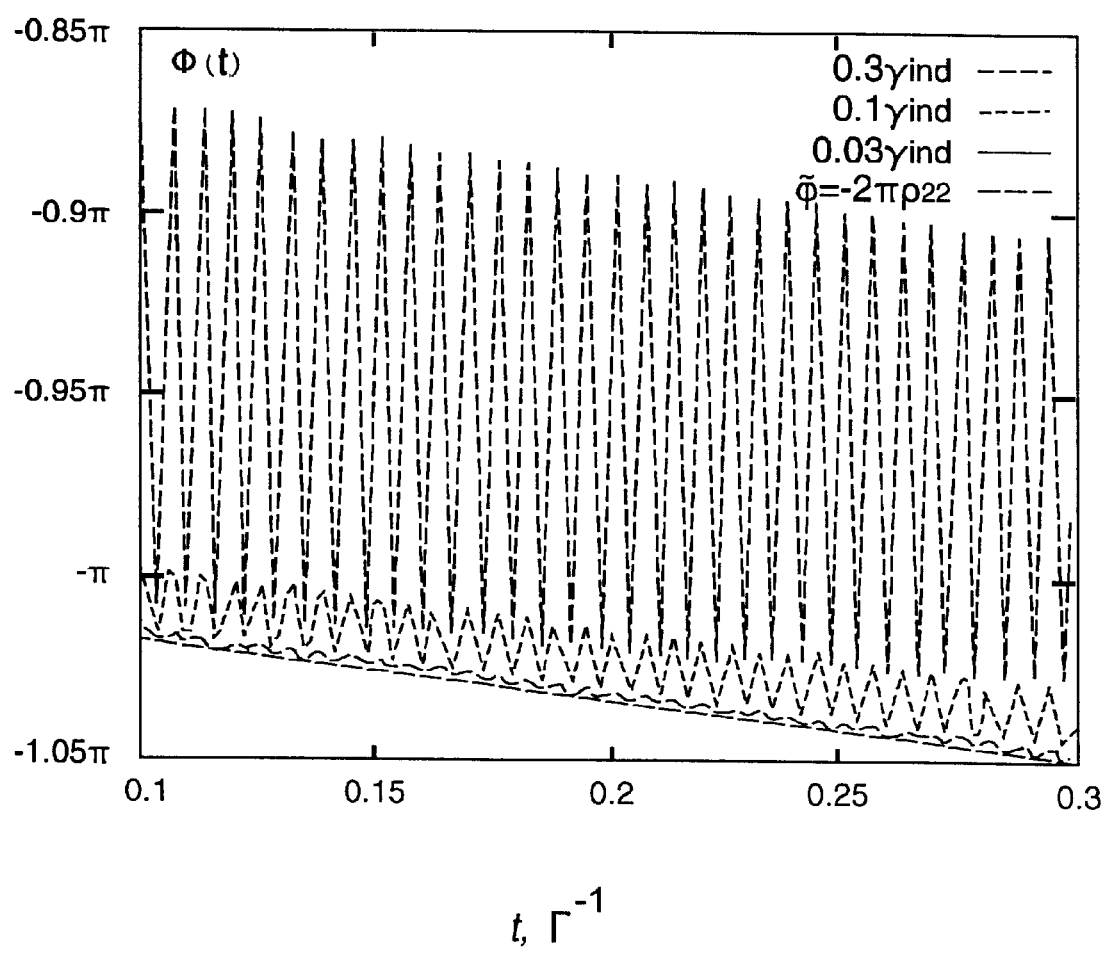
FIG. 3 is a plot of phase locking near atomic resonance for $t<\tau_s$ wherein the polarization rotation angle $\phi$ is plotted exactly versus the approximation of $\phi$.

It is interesting to note that for small $\delta$'s, the extinction ratio $T_{max}/T_{min}$ is approximately unity. This is due to the fact that the phase variations $\phi(t)$ are suppressed over the period $\tau_{ind}$, shown in FIG. 3, resulting in phase locking for $t<\tau_s$.

In conclusion, a model of an all-optical modulator, which can operate continuously for approximately 200 ns was presented. Fast Rabi flopping of the atomic states can also be utilized for all-optical modulation, frequency shift-keying, and realization of all-optical gates/switches (for example, an AND gate), including multilevel logics. Using the above equations for $R_b=\gamma_{ind}/\pi$ calculations reveal that 50 Gbiks data rates per linear channel require pump field $E_p=10V/m$. The intensity of the cw-laser $I_p\approx 125kW/cm^2$ is low enough not to induce optical nonlinearities in a vapor.

A key component in increasing the capacity of fiber optic networks is the ability to switch signals at rates that are significantly higher than electronic switching rates. This device allows switching well beyond the limits of electronic switching. In addition, all-optical switching allows the switching signal to travel in the fiber eliminating the need to supply electronically power remotely. Currently, the telecommunications industry is attempting to increase the capacity of the fiber optic system using Time Division Multiplexing, TDM. In fact, this has been identified as one of the needs for the next generation internet. The present invention has an obvious application as an ultra-high speed multiplexer/demultiplexer for TDM. Currently it is very difficult to generate high frequency side-bands on the optical waves at frequencies of more than 10 GHz, but this device does this easily. In this mode the device can be used to generate an oscillator or dock frequency in the mm wave region.

The preceding example can be repeated with similar success by substituting the generically or specifically described operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An all-optical switch comprising:
   an incident optical signal;
   an optically active polarization rotation medium;
   an optical pump to produce a stimulated emission and to induce Rabi flopping of the atomic states within said polarization rotation medium; and
   a polarizing beam splitter.

2. The switch of claim 1 wherein said optical pump comprises a continuous wave optical pump to continuously stimulate said polarization rotation medium.

3. The switch of claim 1 wherein said optical pump comprises a circularly polarized optical pump to create time-dependent circular birefringence within said polarization rotation medium.

4. The switch of claim 1 further comprising a wavelength selective coupler between said polarization rotation medium and said polarizing beam splitter.

5. The switch of claim 1 wherein said polarization rotation medium comprises a medium selected from the group consisting of an optically active vapor and a solid state medium.

6. The switch of claim 5 wherein said optically active vapor comprises an alkali vapor.

7. The switch of claim 1 wherein said incident optical signal comprises a linearly polarized incident optical signal having a right hand circularly polarized component and a left hand circularly polarized component.

8. The switch of claim 7 wherein said polarization rotation medium has a path length such that said right hand circularly polarized component and said left hand circularly polarized component experience different indices of refraction within said polarization rotation medium.

9. The switch of claim 8 wherein said path length is such that said right hand circularly polarized component and said left hand circularly polarized component experience different indices of refraction within said polarization rotation medium such that they become separated by approximately 180 degrees.

10. The switch of claim 1 wherein said switch is used to effectuate an application selected from the group consisting of multiplexing, demultiplexing, all-optical modulation, frequency shift-keying, and digital logic.

11. The switch of claim 1 wherein said polarization rotation medium comprises a solid state medium and said optical pump comprises a linearly polarized optical pump to produce linear birefringence within said solid state medium.

12. The switch of claim 11 wherein said incident optical signal comprises a linearly polarized incident optical signal.

13. The switch of claim 12 wherein said linearly polarized incident optical signal is polarized at approximately 45 degrees relative to said linearly polarized optical pump.

14. The switch of claim 13 wherein said solid state medium has a path length such that approximately 90 degrees of polarization rotation is provided to said incident optical signal.

15. An all-optical switch comprising:
   an incident optical signal;
   an optically active polarization rotation medium;
   a circularly polarized optical pump to produce a stimulated emission and to create time-dependent circular birefringence within said polarization rotation medium; and
   a polarizing beam splitter.

16. The switch of claim 15 wherein said optical pump comprises a continuous wave optical pump to continuously stimulate said polarization rotation medium.

17. The switch of claim 15 further comprising a wavelength selective coupler between said polarization rotation medium and said polarizing beam splitter.

18. The switch of claim 15 wherein said polarization rotation medium comprises a medium selected from the group consisting of an optically active vapor and a solid state medium.

19. The switch of claim 18 wherein said optically active vapor comprises an alkali vapor.

20. The switch of claim 15 wherein said incident optical signal comprises a linearly polarized incident optical signal having a right hand circularly polarized component and a left hand circularly polarized component.

21. The switch of claim 20 wherein said polarization rotation medium has a path length such that said right hand circularly polarized component and said left hand circularly polarized component experience different indices of refraction within said polarization rotation medium.

22. The switch of claim 21 wherein said path length is such that said right hand circularly polarized component and said left hand circularly polarized component experience different indices of refraction within said polarization rotation medium such that they become separated by approximately 180 degrees.

23. The switch of claim 15 wherein said switch is used to effectuate an application selected from the group consisting of multiplexing, demultiplexing, all-optical modulation, frequency shift-keying, and digital logic.

24. An all-optical switch comprising:
an incident optical signal;
an optically active polarization rotation medium;
an optical pump to produce a stimulated emission within said polarization rotation medium;
a polarizing beam splitter; and
a wavelength selective coupler between said polarization rotation medium and said polarizing beam splitter.

25. An all-optical switch comprising:
an incident optical signal;
an optically active polarization rotation medium selected from the group consisting of an optically active vapor and a solid state medium;
an optical pump to produce a stimulated emission within said polarization rotation medium; and
a polarizing beam splitter.

26. The switch of claim 25 wherein said optical pump comprises a continuous wave optical pump to continuously stimulate said polarization rotation medium.

27. The switch of claim 25 further comprising a wavelength selective coupler between said polarization rotation medium and said polarizing beam splitter.

28. The switch of claim 25 wherein said optically active vapor comprises an alkali vapor.

29. The switch of claim 25 wherein said incident optical signal comprises a linearly polarized incident optical signal having a right hand circularly polarized component and a left hand circularly polarized component.

30. The switch of claim 29 wherein said polarization rotation medium has a path length such that said right hand circularly polarized component and said left hand circularly polarized component experience different indices of refraction within said polarization rotation medium.

31. The switch of claim 30 wherein said path length is such that said right hand circularly polarized component and said left hand circularly polarized component experience different indices of refraction within said polarization rotation medium such that they become separated by approximately 180 degrees.

32. The switch of claim 25 wherein said switch is used to effectuate an application selected from the group consisting of multiplexing, demultiplexing, all-optical modulation, frequency shift-keying, and digital logic.

33. The switch of claim 25 wherein said polarization rotation medium comprises a solid state medium and said optical pump comprises a linearly polarized optical pump to produce linear birefringence within said solid state medium.

34. The switch of claim 33 wherein said incident optical signal comprises a linearly polarized incident optical signal.

35. The switch of claim 34 wherein said linearly polarized incident optical signal is polarized at approximately 45 degrees relative to said linearly polarized optical pump.

36. The switch of claim 35 wherein said solid state medium has a path length such that approximately 90 degrees of polarization rotation is provided to said incident optical signal.

37. An all-optical switch comprising:
an incident optical signal;
an optically active alkali vapor polarization rotation medium;
an optical pump to produce a stimulated emission within said polarization rotation medium; and
a polarizing beam splitter.

38. An all-optical switch comprising:
a linearly polarized incident optical signal having a right hand circularly polarized component and a left hand circularly polarized component;
an optically active polarization rotation medium;
an optical pump to produce a stimulated emission within said polarization rotation medium; and
a polarizing beam splitter.

39. The switch of claim 38 wherein said optical pump comprises a continuous wave optical pump to continuously stimulate said polarization rotation medium.

40. The switch of claim 38 further comprising a wavelength selective coupler between said polarization rotation medium and said polarizing beam splitter.

41. The switch of claim 38 wherein said polarization rotation medium comprises an optically active alkali vapor.

42. The switch of claim 38 wherein said polarization rotation medium has a path length such that said right hand circularly polarized component and said left hand circularly polarized component experience different indices of refraction within said polarization rotation medium.

43. The switch of claim 42 wherein said path length is such that said right hand circularly polarized component and said left hand circularly polarized component experience different indices of refraction within said polarization rotation medium such that they become separated by approximately 180 degrees.

44. The switch of claim 38 wherein said switch is used to effectuate an application selected from the group consisting of multiplexing, demultiplexing, all-optical modulation, frequency shift-keying, and digital logic.

45. The switch of claim 38 wherein said polarization rotation medium comprises a solid state medium and said optical pump comprises a linearly polarized optical pump to produce linear birefringence within said solid state medium.

46. The switch of claim 45 wherein said linearly polarized incident optical signal is polarized at approximately 45 degrees relative to said linearly polarized optical pump.

47. The switch of claim 46 wherein said solid state medium has a path length such that approximately 90 degrees of polarization rotation is provided to said incident optical signal.

48. An all-optical switch comprising:
a linearly polarized incident optical signal having a right hand circularly polarized component and a left hand circularly polarized component;
an optically active polarization rotation medium having a path length such that said right hand circularly polarized component and said left hand circularly polarized component experience different indices of refraction within said polarization rotation medium;
an optical pump to produce a stimulated emission within said polarization rotation medium; and
a polarizing beam splitter.

49. An all-optical switch comprising:
a linearly polarized incident optical signal having a right hand circularly polarized component and a left hand circularly polarized component;
an optically active polarization rotation medium having a path length such that said right hand circularly polarized component and said left hand circularly polarized component experience different indices of refraction within said polarization rotation medium such that they become separated by approximately 180 degrees;

an optical pump to produce a stimulated emission within said polarization rotation medium; and a polarizing beam splitter.

50. An all-optical switch comprising:

an incident optical signal;

an optically active polarization rotation medium;

an optical pump to produce a stimulated emission within said polarization rotation medium; and a polarizing beam splitter, wherein said switch is used to effectuate an application selected from the group consisting of multiplexing, demultiplexing, all-optical modulation, frequency shift-keying, and digital logic.

51. An all-optical switch comprising:

an incident optical signal;

an optically active solid state polarization rotation medium;

a linearly polarized optical pump to produce a stimulated emission within said polarization rotation medium and to produce linear birefringence within said polarization rotation medium; and a polarizing beam splitter.

52. An all-optical switch comprising:

linearly polarized incident optical signal;

an optically active solid state polarization rotation medium;

a linearly polarized optical pump to produce a stimulated emission within said polarization rotation medium and to produce linear birefringence within said solid state medium; and a polarizing beam splitter.

53. An all-optical switch comprising:

linearly polarized incident optical signal;

an optically active solid state polarization rotation medium;

a linearly polarized optical pump to produce a stimulated emission within said polarization rotation medium and to produce linear birefringence within said polarization rotation medium; and a polarizing beam splitter, wherein said linearly polarized incident optical signal is polarized at approximately 45 degrees relative to said linearly polarized optical pump.

54. An all-optical switch comprising:

linearly polarized incident optical signal;

an optically active solid state polarization rotation medium having a path length such that approximately 90 degrees of polarization rotation is provided to said incident optical signal;

a linearly polarized optical pump to produce a stimulated emission within said polarization rotation medium and to produce linear birefringence within said polarization rotation medium; and a polarizing beam splitter, wherein said linearly polarized incident optical signal is polarized at approximately 45 degrees relative to said linearly polarized optical pump.

55. A method of providing all-optical switching, the method comprising the steps of:

a) providing an optical signal;

b) passing the optical signal through an optically active polarization rotation medium;

c) stimulating emission within the polarization rotation medium by pumping with an optical pump and inducing Rabi flopping of the atomic states; and d) splitting the components of the optical signal with a polarizing beam splitter after having passed through the polarization rotation medium.

56. The method of claim 55 wherein the stimulating emission step comprises continuously pumping to continuously stimulate said polarization rotation medium.

57. The method of claim 55 further comprising the step of creating time-dependent circular birefringence within the polarization rotation medium with a circularly polarized optical pump.

58. The method of claim 55 further comprising the step of coupling the optical signal coming out of the polarization rotation medium with the polarizing beam splitter using a wavelength selective coupler.

59. The method of claim 55 wherein the step of passing the optical signal through an optically active polarization rotation medium comprises passing the optical signal through a medium selected from the group consisting of an optically active vapor and a solid state medium.

60. The method of claim 59 wherein the step of passing the optical signal through an optically active vapor comprises passing the optical signal through an alkali vapor.

61. The method of claim 55 wherein the step of providing an optical signal comprises providing a linearly polarized optical signal having a right hand circularly polarized component and a left hand circularly polarized component.

62. The method of claim 61 wherein the step of passing the optical signal through an optically active polarization rotation medium comprises providing a path length such that the right hand circularly polarized component and left hand circularly polarized component of the optical signal experience different indices of refraction within the polarization rotation medium.

63. The method of claim 62 wherein the step of providing a path length such that different indices of refraction are experienced by the two components comprises separating the right hand circularly polarized component and left hand circularly polarized component of the optical signal by approximately 180 degrees.

64. The method of claim 55 further comprising at least one of the steps selected from the group consisting of multiplexing the optical signal, demultiplexing the optical signal, modulating the optical signal, frequency shift-keying the optical signal, and digital logic gating the optical signal.

65. The method of claim 55 wherein the step of passing the optical signal through an optically active polarization rotation medium comprises passing the optical signal through an optically active solid state medium and further comprising the step of creating linear birefringence within the solid state medium with a linearly polarized optical pump.

66. The method of claim 65 wherein the step of providing an optical signal comprises providing a linearly polarized optical signal.

67. The method of claim 66 wherein the step of providing a linearly polarized optical signal comprises providing a linearly polarized optical signal that is polarized at approximately 45 degrees relative to the linearly polarized optical pump.

68. The method of claim 67 wherein the step of passing the optical signal through a solid state medium comprises providing a path length such that approximately 90 degrees of polarization rotation is provided to the optical signal.

69. A method of providing all optical switching, the method comprising the steps of:

a) providing an optical signal;

b) passing the optical signal through an optically active polarization rotation medium;

c) continuously stimulating emission within the polarization rotation medium by continuously pumping with an optical pump; and d) splitting the components of the optical signal with a polarizing beam splitter after having passed through the polarization rotation medium.

70. The method of claim 69 further comprising the step of creating time-dependent circular birefringence within the polarization rotation medium with a circularly polarized optical pump.

71. The method of claim 69 further comprising the step of coupling the optical signal coming out of the polarization rotation medium with the polarizing beam splitter using a wavelength selective coupler.

72. The method of claim 69 wherein the step of passing the optical signal through an optically active polarization rotation medium comprises passing the optical signal through a medium selected from the group consisting of an optically active vapor and a solid state medium.

73. The method of claim 72 wherein the step of passing the optical signal through an optically active vapor comprises passing the optical signal through an alkali vapor.

74. The method of claim 69 wherein the step of providing an optical signal comprises providing a linearly polarized optical signal having a right hand circularly polarized component and a left hand circularly polarized component.

75. The method of claim 74 wherein the step of passing the optical signal through an optically active polarization rotation medium comprises providing a path length such that the right hand circularly polarized component and left hand circularly polarized component of the optical signal experience different indices of refraction within the polarization rotation medium.

76. The method of claim 75 wherein the step of providing a path length such that different indices of refraction are experienced by the two components comprises separating the right hand circularly polarized component and left hand circularly polarized component of the optical signal by approximately 180 degrees.

77. The method of claim 69 further comprising at least one of the steps selected from the group consisting of multiplexing the optical signal, demultiplexing the optical signal, modulating the optical signal, frequency shift-keying the optical signal, and digital logic gating the optical signal.

78. The method of claim 69 wherein the step of passing the optical signal through an optically active polarization rotation medium comprises passing the optical signal through an optically active solid state medium and further comprising the step of creating linear birefringence within the solid state medium with a linearly polarized optical pump.

79. The method of claim 78 wherein the step of providing an optical signal comprises providing a linearly polarized optical signal.

80. The method of claim 79 wherein the step of providing a linearly polarized optical signal comprises providing a linearly polarized optical signal that is polarized at approximately 45 degrees relative to the linearly polarized optical pump.

81. The method of claim 80 wherein the step of passing the optical signal through a solid state medium comprises providing a path length such that approximately 90 degrees of polarization rotation is provided to the optical signal.

82. A method of providing all-optical switching, the method comprising the steps of:

a) providing an optical signal;

b) passing the optical signal through an optically active polarization rotation medium;

c) stimulating emission and creating time-dependent circular birefringence within the polarization rotation medium by pumping with a circularly polarized optical pump; and d) splitting the components of the optical signal with a polarizing beam splitter after having passed through the polarization rotation medium.

83. The method of claim 82 further comprising the step of coupling the optical signal coming out of the polarization rotation medium with the polarizing beam splitter using a wavelength selective coupler.

84. The method of claim 82 wherein the step of passing the optical signal through an optically active polarization rotation medium comprises passing the optical signal through a medium selected from the group consisting of an optically active vapor and a solid state medium.

85. The method of claim 84 wherein the step of passing the optical signal through an optically active vapor comprises passing the optical signal through an alkali vapor.

86. The method of claim 82 wherein the step of providing an optical signal comprises providing a linearly polarized optical signal having a right hand circularly polarized component and a left hand circularly polarized component.

87. The method of claim 86 wherein the step of passing the optical signal through an optically active polarization rotation medium comprises providing a path length such that the right hand circularly polarized component and left hand circularly polarized component of the optical signal experience different indices of refraction within the polarization rotation medium.

88. The method of claim 87 wherein the step of providing a path length such that different indices of refraction are experienced by the two components comprises separating the right hand circularly polarized component and left hand circularly polarized component of the optical signal by approximately 180 degrees.

89. The method of claim 82 further comprising at least one of the steps selected from the group consisting of multiplexing the optical signal, demultiplexing the optical signal, modulating the optical signal, frequency shift-keying the optical signal, and digital logic gating the optical signal.

90. A method of providing all-optical switching, the method comprising the steps of:

a) providing an optical signal;

b) passing the optical signal through an optically active polarization rotation medium;

c) stimulating emission within the polarization rotation medium by pumping with an optical pump;

d) splitting the components of the optical signal with a polarizing beam splitter after having passed through the polarization rotation medium; and e) coupling the optical signal coming out of the polarization rotation medium with the polarizing beam splitter using a wavelength selective coupler.

91. A method of providing all-optical switching, the method comprising the steps of:

a) providing an optical signal;

b) passing the optical signal through an optically active polarization rotation medium selected from the group consisting of an optically active vapor and a solid state medium;

c) stimulating emission within the polarization rotation medium by pumping with an optical pump; and d) splitting the components of the optical signal with a polarizing beam splitter after having passed through the polarization rotation medium.

92. The method of claim 91 further comprising the step of coupling the optical signal coming out of the polarization rotation medium with the polarizing beam splitter using a wavelength selective coupler.

93. The method of claim 91 wherein the step of passing the optical signal through an optically active vapor comprises passing the optical signal through an alkali vapor.

94. The method of claim 91 wherein the step of providing an optical signal comprises providing a linearly polarized optical signal having a right hand circularly polarized component and a left hand circularly polarized component.

95. The method of claim 94 wherein the step of passing the optical signal through an optically active polarization rotation medium comprises providing a path length such that the right hand circularly polarized component and left hand circularly polarized component of the optical signal experience different indices of refraction within the polarization rotation medium.

96. The method of claim 95 wherein the step of providing a path length such that different indices of refraction are experienced by the two components comprises separating the right hand circularly polarized component and left hand circularly polarized component of the optical signal by approximately 180 degrees.

97. The method of claim 91 further comprising at least one of the steps selected from the group consisting of multiplexing the optical signal, demultiplexing the optical signal, modulating the optical signal, frequency shift-keying the optical signal, and digital logic gating the optical signal.

98. The method of claim 91 wherein the step of passing the optical signal through an optically active polarization rotation medium comprises passing the optical signal through an optically active solid state medium and further comprising the step of creating linear birefringence within the solid state medium with a linearly polarized optical pump.

99. The method of claim 98 wherein the step of providing an optical signal comprises providing a linearly polarized optical signal.

100. The method of claim 99 wherein the step of providing a linearly polarized optical signal comprises providing a linearly polarized optical signal that is polarized at approximately 45 degrees relative to the linearly polarized optical pump.

101. The method of claim 100 wherein the step of passing the optical signal through a solid state medium comprises providing a path length such that approximately 90 degrees of polarization rotation is provided to the optical signal.

102. A method of providing all-optical switching, the method comprising the steps of:
   a) providing an optical signal;
   b) passing the optical signal through an optically active alkali vapor polarization rotation medium;
   c) stimulating emission within the polarization rotation medium by pumping with an optical pump; and
   d) splitting the components of the optical signal with a polarizing beam splitter after having passed through the polarization rotation medium.

103. A method of providing all-optical switching, the method comprising the steps of:
   a) providing a linearly polarized optical signal having a right hand circularly polarized component and a left hand circularly polarized component;
   b) passing the optical signal through an optically active polarization rotation medium;
   c) stimulating emission within the polarization rotation medium by pumping with an optical pump; and
   d) splitting the components of the optical signal with a polarizing beam splitter after having passed through the polarization rotation medium.

104. The method of claim 103 further comprising the step of coupling the optical signal coming out of the polarization rotation medium with the polarizing beam splitter using a wavelength selective coupler.

105. The method of claim 103 wherein the step of passing the optical signal through an optically active polarization rotation medium comprises passing the optical signal through an optically active alkali vapor.

106. The method of claim 103 wherein the step of passing the optical signal through an optically active polarization rotation medium comprises providing a path length such that the right hand circularly polarized component and left hand circularly polarized component of the optical signal experience different indices of refraction within the polarization rotation medium.

107. The method of claim 106 wherein the step of providing a path length such that different indices of refraction are experienced by the two components comprises separating the right hand circularly polarized component and left hand circularly polarized component of the optical signal by approximately 180 degrees.

108. The method of claim 103 further comprising at least one of the steps selected from the group consisting of multiplexing the optical signal, demultiplexing the optical signal, modulating the optical signal, frequency shift-keying the optical signal, and digital logic gating the optical signal.

109. The method of claim 103 wherein the step of passing the optical signal through an optically active polarization rotation medium comprises passing the optical signal through an optically active solid state medium and further comprising the step of creating linear birefringence within the solid state medium with a linearly polarized optical pump.

110. The method of claim 109 wherein the step of providing a linearly polarized optical signal comprises providing a linearly polarized optical signal that is polarized at approximately 45 degrees relative to the linearly polarized optical pump.

111. The method of claim 110 wherein the step of passing the optical signal through a solid state medium comprises providing a path length such that approximately 90 degrees of polarization rotation is provided to the optical signal.

112. A method of providing all-optical switching, the method comprising the steps of:
   a) providing a linearly polarized optical signal having a right hand circularly polarized component and a left hand circularly polarized component;
   b) passing the optical signal through an optically active polarization rotation medium and providing a path length such that the right hand circularly polarized component and left hand circularly polarized component of the optical signal experience different indices of refraction within the polarization rotation medium;
   c) stimulating emission within the polarization rotation medium by pumping with an optical pump; and
   d) splitting the components of the optical signal with a polarizing beam splitter after having passed through the polarization rotation medium.

113. A method of providing all optical switching, the method comprising the steps of:
   a) providing a linearly polarized optical signal having a right hand circularly polarized component and a left hand circularly polarized component;

b) passing the optical signal through an optically active polarization rotation medium and providing a path length such that the right hand circularly polarized component and left hand circularly polarized component of the optical signal experience different indices of refraction within the polarization rotation medium and are separated by approximately 180 degrees;

c) stimulating emission within the polarization rotation medium by pumping with an optical pump; and d) splitting the components of the optical signal with a polarizing beam splitter after having passed through the polarization rotation medium.

114. A method of providing all-optical switching, the method comprising the steps of:

a) providing an optical signal;

b) passing the optical signal through an optically active polarization rotation medium;

c) stimulating emission within the polarization rotation medium by pumping with an optical pump; and d) splitting the components of the optical signal with a polarizing beam splitter after having passed through the polarization rotation medium; and e) at least one of the steps selected from the group consisting of multiplexing the optical signal, demultiplexing the optical signal, modulating the optical signal, frequency shift-keying the optical signal, and digital logic gating the optical signal.

115. A method of providing all-optical switching, the method comprising the steps of:

a) providing an optical signal;

b) passing the optical signal through an optically active solid state polarization rotation medium;

c) stimulating emission and creating linear birefringence within the solid state medium by pumping with a linearly polarized optical pump; and d) splitting the components of the optical signal with a polarizing beam splitter after having passed through the polarization rotation medium.

116. A method of providing all-optical switching, the method comprising the steps of:

a) providing a linearly polarized optical signal;

b) passing the optical signal through an optically active solid state polarization rotation medium;

c) stimulating emission and creating linear birefringence within the solid state medium by pumping with a linearly polarized optical pump; and d) splitting the components of the optical signal with a polarizing beam splitter after having passed through the polarization rotation medium.

117. A method of providing all-optical switching, the method comprising the steps of:

a) providing a linearly polarized optical signal that is polarized at approximately 45 degrees relative to a linearly polarized optical pump;

b) passing the optical signal through an optically active solid state polarization rotation medium;

c) stimulating emission and creating linear birefringence within the solid state medium by pumping with the linearly polarized optical pump; and d) splitting the components of the optical signal with a polarizing beam splitter after having passed through the polarization rotation medium.

118. A method of providing all-optical switching, the method comprising the steps of:

a) providing a linearly polarized optical signal that is polarized at approximately 45 degrees relative to a linearly polarized optical pump;

b) passing the optical signal through an optically active solid state polarization rotation medium and providing a path length such that approximately 90 degrees of polarization rotation is provided to the optical signal;

c) stimulating emission and creating linear birefringence within the solid state medium by pumping with the linearly polarized optical pump; and d) splitting the components of the optical signal with a polarizing beam splitter after having passed through the polarization rotation medium.

* * * * *